(12) United States Patent
Yang

(10) Patent No.: US 6,908,138 B2
(45) Date of Patent: Jun. 21, 2005

(54) AWNING SUPPORTED ON ROOF PANEL FOR USE OUTDOORS

(75) Inventor: Ming-Shun Yang, Taipei (TW)

(73) Assignee: Formosa Saint Jose Corporation, Taipei (TW)

(*) Notice: Subject to any disclaimer, the term of this patent is extended or adjusted under 35 U.S.C. 154(b) by 0 days.

(21) Appl. No.: 10/649,814

(22) Filed: Aug. 28, 2003

(65) Prior Publication Data

US 2005/0046232 A1 Mar. 3, 2005

(51) Int. Cl.⁷ .......................... E04H 15/08; B60R 9/058
(52) U.S. Cl. ................ 296/95.1; 135/88.1; 160/370.22; 224/309; 224/559
(58) Field of Search .......................... 296/95.1, 136.01, 296/136; 248/205.8, 205.9, 206.1, 206.2, 309.3; 224/309, 314, 322, 559; 160/24, 370.22, DIG. 13; 135/88.07, 88.1, 88.11, 88.16, 88, 88.12

(56) References Cited

U.S. PATENT DOCUMENTS

| | | | | |
|---|---|---|---|---|
| 2,594,065 A | * | 4/1952 | O'Neill | 135/88.16 |
| 2,621,836 A | * | 12/1952 | McMiller | 135/88.16 |
| 3,152,832 A | * | 10/1964 | Kamp | 296/95.1 |
| 3,304,996 A | * | 2/1967 | Francis | 296/95.1 |
| 3,375,036 A | * | 3/1968 | Francis | 296/95.1 |
| 3,957,301 A | * | 5/1976 | Huber | 296/95.1 |
| 4,929,016 A | * | 5/1990 | Kastanis | 296/95.1 |
| 5,558,145 A | * | 9/1996 | Baka | 135/88.12 |
| 5,700,048 A | * | 12/1997 | Wade et al. | 296/163 |
| 6,059,010 A | * | 5/2000 | Yang | 160/370.22 |
| 6,142,432 A | * | 11/2000 | Amussen | 248/205.8 |
| 6,237,983 B1 | * | 5/2001 | Yang | 296/95.1 |

* cited by examiner

Primary Examiner—Lori L. Coletta
(74) Attorney, Agent, or Firm—Troxell Law Office PLLC

(57) ABSTRACT

An awning supported on roof panel for use outdoors mainly includes an automatic shade roller, a plurality of supporting frames, and a plurality of adjustable sucker units coupled with the supporting frames. Each of the supporting frames is provided at two lateral sides with two elongated slots, in which the sucker units may be shifted to a desired position relative to the supporting frame. The supporting frame is integrally provided below each lateral side with two vertical framing walls, and at a central top portion with a raised pad that has two mortises formed at two diagonally opposite corners. With the above arrangements, the shade roller, the supporting frames, and the sucker units may be easily assembled for mounting on a roof panel to provide an awning for use outdoors without using any tool.

8 Claims, 6 Drawing Sheets

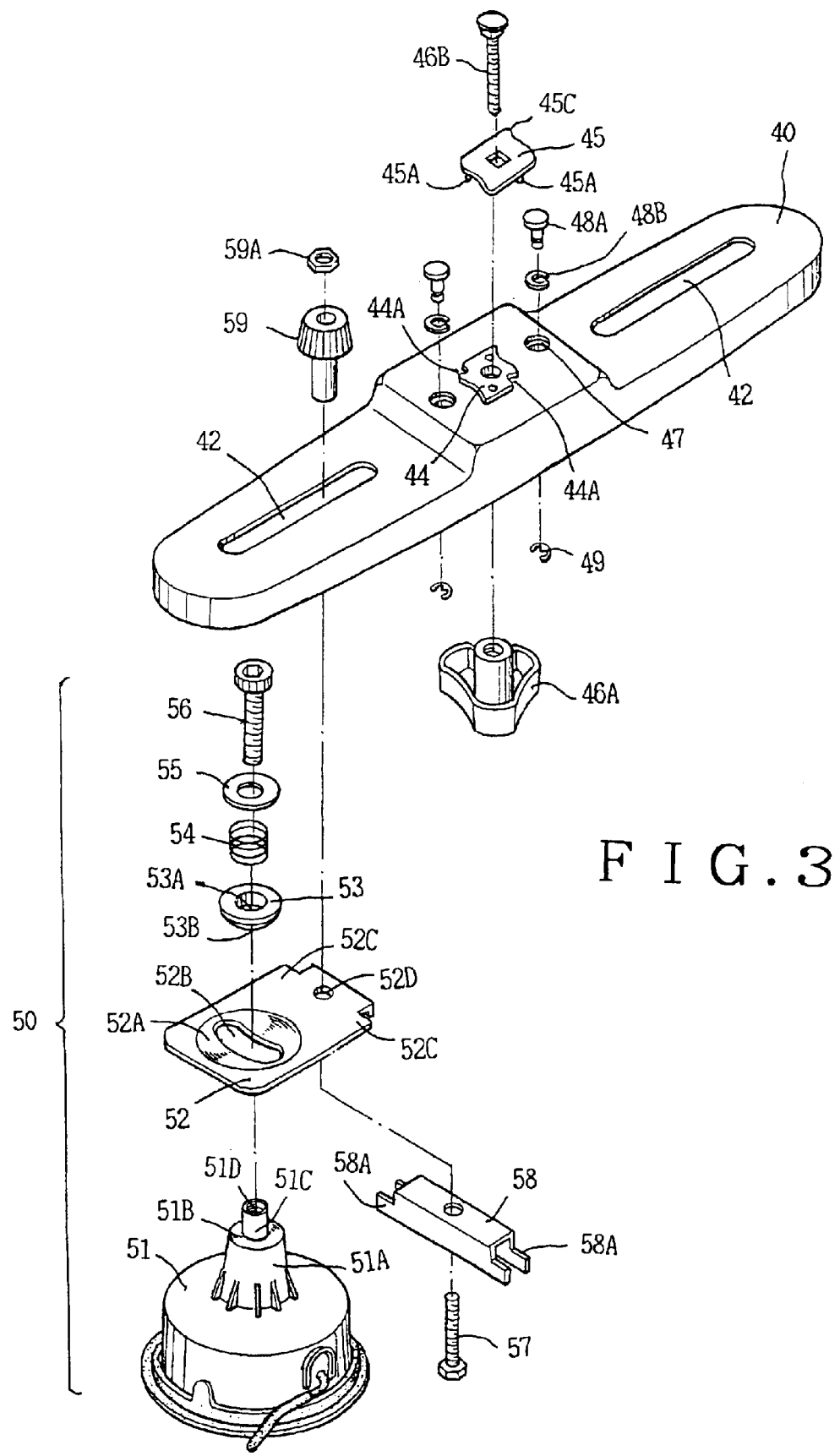
F I G. 3

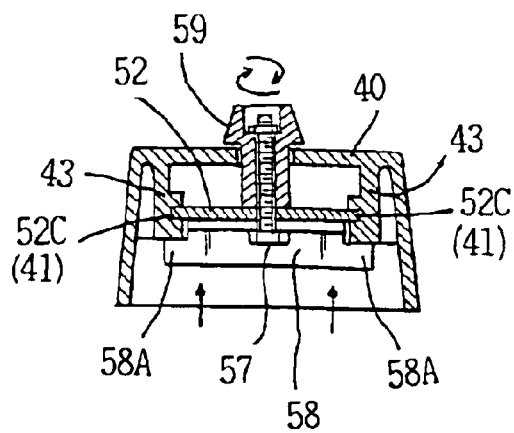
F I G. 6
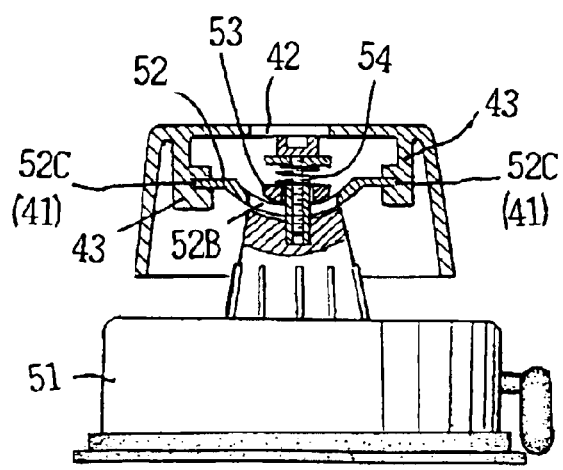
F I G. 7

AWNING SUPPORTED ON ROOF PANEL FOR USE OUTDOORS

FIELD OF THE INVENTION

The present invention relates to an awning supported on roof panel for use outdoors, an more particularly to an awning for use outdoors that may be easily detachably connected to a roof panel of an automobile to provide a shade for people during outdoor activities, such as camping and the like.

BACKGROUND OF THE INVENTION

It has become a popular way among people to enjoy weekends, holidays, and vacations by driving to the countryside for outdoors leisure activities, such as sightseeing, fishing, camping, and going to some resorts. A problem with such outdoors activities in summertime is there are not always shady places available for taking a rest. It is therefore desirable to have a car equipped with sun-blocking means.

There are currently many awnings for use outdoors available for mounting on a roof panel of an automobile. However, various kinds of tools and fastening means are needed to first fix four sets of locating means to outer edges of the roof panel, such as drip moldings. Thereafter, the heavy awning is screwed to the four sets of locating means before it can be extended to block sunshine. It is apparently complicate and troublesome to mount the conventional awning on roof panel for use outdoors. Once the awning has been fixed to the roof panel, it is not easy to dismount it therefrom. Therefore, a user would usually keep the awning fixed to the roof panel. However, the awning fixed to the roof panel looks strange when the user drives the car carrying the awning on the street. The awning fixed to the roof panel over a long time tends to have a shortened usable life due to exposure to sunshine and rainwater from time to time. The awning fixed to the roof panel also increases an overall height of the car carrying it to prevent the car from driving into an elevator-type mechanical parking that usually has a fixed height.

FIG. 1 is an exploded perspective view of a conventional awning supported on roof panel for use outdoors developed by the same inventor of the present invention. As shown, the awning includes an automatic shade roller (10), two long metal frames (20) for supporting the shade roller (10) thereon, and four sucker units (30) for firmly attaching to a roof panel of an automobile and supporting the two metal frames (20) thereon. The above-mentioned awning may be easily detachably mounted on the roof panel to solve the problem existed in the conventional awning for mounting on a car. Moreover, since the sucker units (30) may be adjusted to different angular positions relative to the roof panel, they could be attached to the roof panel without being affected by, for example, antenna frame and roof rack that are frequently fixedly provided on the roof panel of a car, particularly a station wagon. The sucker units (30) may also be mounted on a roof panel having a relatively large curvature.

However, the shade roller (10) must be connected to the two long metal frames (20) by way of sequentially extending screws (21) through two fixing plates (22) and through holes (23) on the long metal frames (20) to engage with nuts (24) below the metal frames (20) and thereby associate the fixing plates (22) with the metal frames (20), and then locating the fixing plates (22) in a slide way (11) provided at a lower side of the shade roller (10), and finally tightening the nuts (24) to the screws (21) for the shade roller (10) to fixedly mount on the two metal frames (20). From the standpoint of consumers, it is desirable to further simply lift the structure of the above-described awning supported on roof panel for use outdoors, so that a user may handle the awning in an even more convenient manner.

SUMMARY OF THE INVENTION

A primary object of the present invention is to provide an awning supported on roof panel for use outdoors. To achieve the above and other objects, the awning of the present invention mainly includes an automatic shade roller, a plurality of supporting frames, and a plurality of adjustable sucker units coupled with the supporting frames. Each of the supporting frames is provided at two lateral sides with two elongated slots, in which the sucker units may be shifted to desired positions relative to the supporting frame. The supporting frame is integrally provided below each lateral side with two vertical framing walls, and at a central top portion with a raised pad that has two mortises formed at two diagonally opposite corners. With the above arrangements, the shade roller, the supporting frames, and the sucker units may be easily assembled to a roof panel of an automobile without using any tool to provide an awning for use outdoors.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is an exploded perspective view of a supporting frame and an adjustable sucker unit included in the awning of the present invention;

FIG. 6 is a sectional view taken along line B—B of FIG. 4; and

FIG. 7 is a partially sectional view taken along line C—C of FIG. 4.

DETAILED DESCRIPTION OF THE PREFERRED EMBODIMENTS

Figure 1:
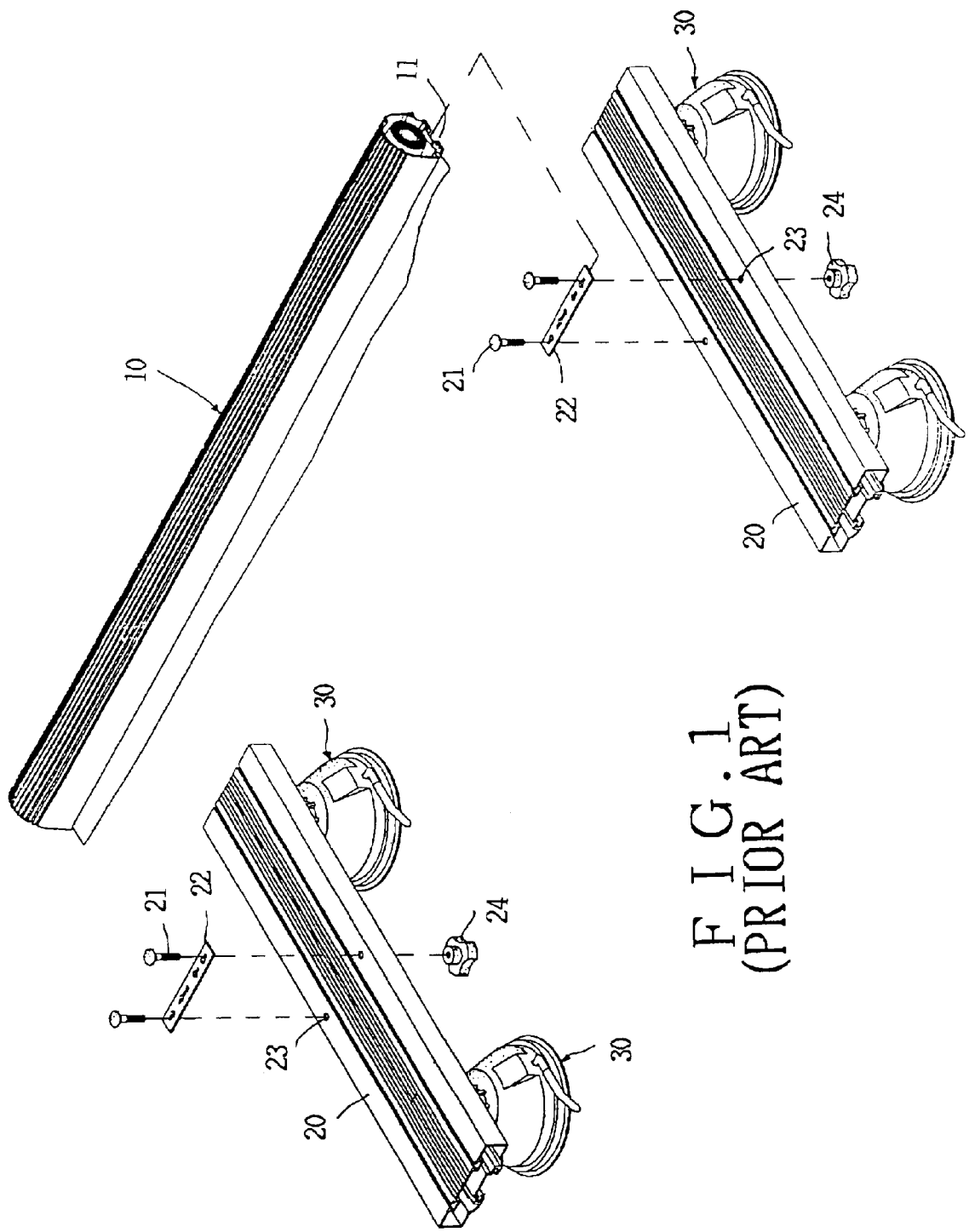
FIG. 1 is an exploded perspective view of a conventional awning supported on roof panel for use outdoors.

Please refer to FIGS. 2, 3, 4, and 5 in which an awning supported on roof panel for use outdoors according to the present invention is shown. As shown, the awning mainly includes an automatic shade roller (10), a plurality of supporting frames (40) (two are shown in the illustrated drawings), and a plurality of adjustable sucker units (50) (four in two pairs are shown in the illustrated drawings) movably connected at a top to the supporting frames (40) and adjustably fixed at a bottom to a roof panel of an automobile (not shown). The automatic shade roller (10) is detachably mounted on the two supporting frames (40) to straddle a space between them.

The adjustable sucker unit (50) includes from bottom to top a sucker (51), a slidable plate (52), a round-bottomed disk-shaped slide (53), a buffer spring (54), a collar (55), and a long bolt (56).

The sucker (51) is integrally formed at a top center with a locating base (51A), a top surface of which is provided with a round, concaved shallow recess (51B). An upward projected sleeve (51C) having internal screw threads (51D) is integrally formed on a top center of the locating base (51A).

The slidable plate (52) is provided at a predetermined position near a central area thereof with a round-bottomed recess portion (52A), which has a curvature corresponding to that of the concaved shallow recess (51B) on the top of the sucker (51), and is provided with a long opening (52B) for the upward projected sleeve (51C) of the sucker (51) to extend therethrough. Thereby, when the slidable plate (51) is supported on the locating base (51A) with the recess portion (52A) seated in the shallow recess (51B) and the sleeve (51C) located in the long opening (52B), the slidable plate (52) may be guided by the sleeve (51C) and the long opening (52B) to slide on the shallow recess (51B) to any desired angular position relative to the sucker (51), so that the slidable plate (52) is always in a horizontal plane.

The disk-shaped slide (53) is provided at a central area with a through shaft hole (53A) adapted to receive the sleeve (51C) of the sucker (51) therein, and at a bottom with a downward convex portion (53B). The convex portion (53B) has a curvature corresponding to that of the round-bottomed recess portion (52A) on the slidable plate (52), allowing the disk-shaped slide (53) to slidably seat in the recess portion (52A).

When the slidable plate (52) and the disk-snaped slide (53) are sequentially seated on the shallow recess (51B) on the top of the locating base (51A) of the sucker (51), the sleeve (51C) is upward projected from the long opening (52B) of the slidable plate (52) and the shaft hole (53A) of the disk-shaped slide (53). The buffer spring (54) may then be put around the projected sleeve (51C) with a top of the sleeve (51C) pressing against a lower side of the collar (55), and the long bolt (56) may be screwed into the sleeve (51C) to engage with the internal threads (51D). An elastic force of the buffer spring (54) provides the slidable plate (52) and the disk-shaped slide (53) with a flexible space to slidably turn about the sleeve (51C) by 360 degrees, or slide along the long opening (52B). Whereby when the sucker (51) is firmly attached to a roof panel of any type of automobile, the slidable plate (52) may be adjusted by any angle relative to the sucker (51) to always locate in a horizontal plane.

As can be seen from FIGS. 3 to 7, the slidable plate (52) has two longitudinal sides formed into two wing protions (52C), and is provided at a position with a though hole (52D) opposite to the recess portion (52A).

The supporting frame (40) is provided at two lateral sides with two elongated slots (42). As can be seen from FIGS. 5, 6, and 7, the supporting frame (40) is integrally provided in each lateral side with a pair of vertically downward extended framing walls (43), at a lower part of two inner wall surfaces of which two corresponding channels (41) are provided. The two channels (41) are so dimensioned that they are adapted to receive the two wing portions (52C) of the slidable plate (52) therein, so that the slidable plate (52) may be slid along the two channels (41) to adjust the position of the sucker unit (50) relative to the supporting frame (40).

When the two wing portions (52C) of the slidable plate (52) are received in the two channels (41) below each lateral side of the supporting frame (40), a bolt (57) is upward extended through a hold-down member (58), the through hole (52D) on the slidable plate (52), and the elongated slot (42) on the lateral side of the supporting frame (40) to tightly engate with a turning knob (59) and a nut (59A) above the elongated slot (42).

Please refer to FIGS. 3 and 6. The hold-down member (58) includes two ends that are cut into two right-angled guides (58A) adapted to fitly bear against two lower inner corners of the two channels (41), so that the hold-down member (58) may be slid along the lower inner corners of the channels (41), as can be best seen from FIG. 6. When it is desired to fixedly hold the slidable plate (52) and the sucker unit (50) to the supporting frame (40), simply turn and tighten the knob (59) to move the hold-down member (58) upward to finally firmly press the slidable plate (52) against the channels (41) without the risk of moving in the channels (41). On the other hand, when it is desired to shift the sucker unit (50) to a desired position, simply turn and loosen the knob (59) and move the sucker unit (50) along the elongated slot (42) on the supporting frame (40). Since the two sucker units (50) may be freely moved in the two elongated slots (42), they could be easily adjusted in position to quickly and conveniently mount on a roof panel of any type of automobile to overcome any possible obstacle, projection, rib, or big difference in the curvature at different areas on the roof panel without the need of using any hand tool.

Figure 4:
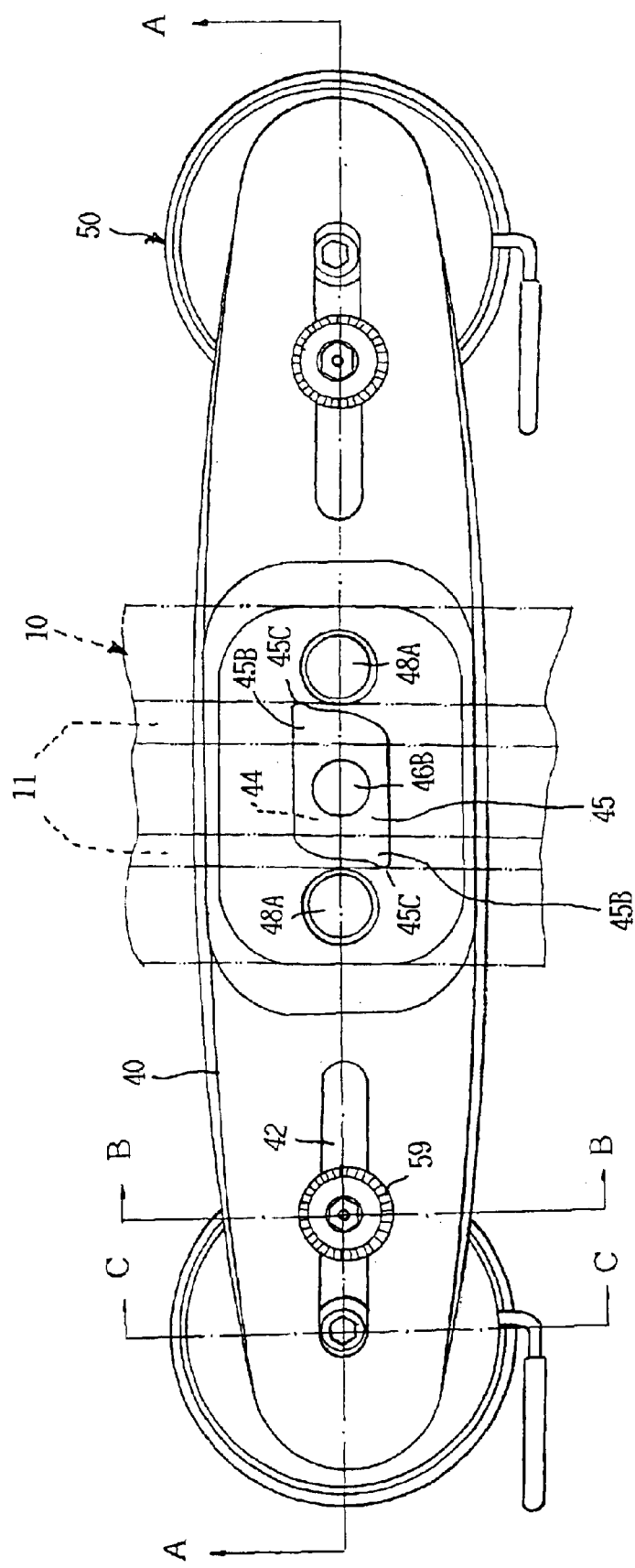
FIG. 4 is a top plan view of the supporting frame of FIG. 3.
Figure 5:
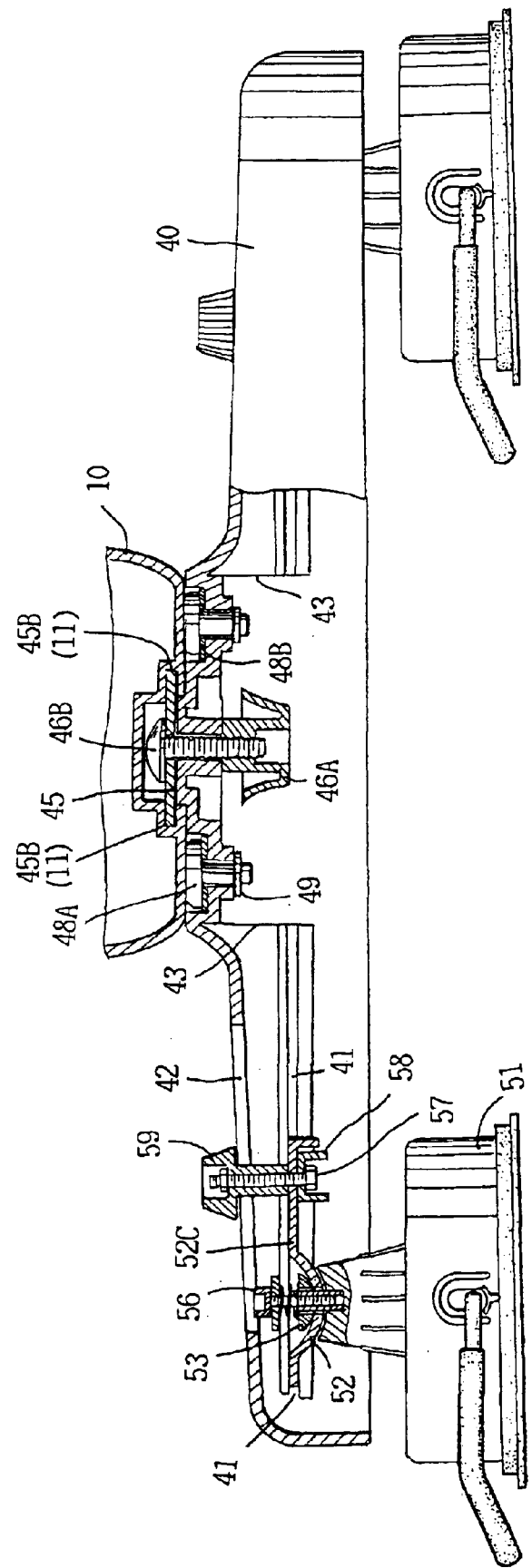
FIG. 5 is a partially sectional view taken along line A—A of FIG. 4.

As can be seen from FIGS. 3, 4, and 5, the supporting frame (40) is integrally provided at a central top portion with a raised pad (44), on a top of which a retaining plate (45) is mounted. The retaining plate (45) has two opposite longitudinal edges longer than any two opposite sides of the raised pad (44), and is provided at a lower side below two diagonally opposite corners with two downward extended tenons (45A) to engage with two mortises (44A) correspondingly provided at two diagonally opposite corners of the pad (44). When the retaining plate (45) is fixedly mounted on the top of the raised pad (44) with the two tenons (45A) fitted in the two mortises (44A), the retaining plate (45) and the raised pad (44) may be locked into one unit using a turning knob (46A) and a bolt (46B) without the risk of easily separating from each other.

Since the retaining plate (45) has an overall length larger than that of the raised pad (44), two end portions (45B) of the retaining plate (45) are projected from an outer periphery of the raised pad (44). That is, there is a space naturally formed between the central top portion of the supporting frame (40) and the two end portions (45B) of the retaining plate (45).

Figure 2:
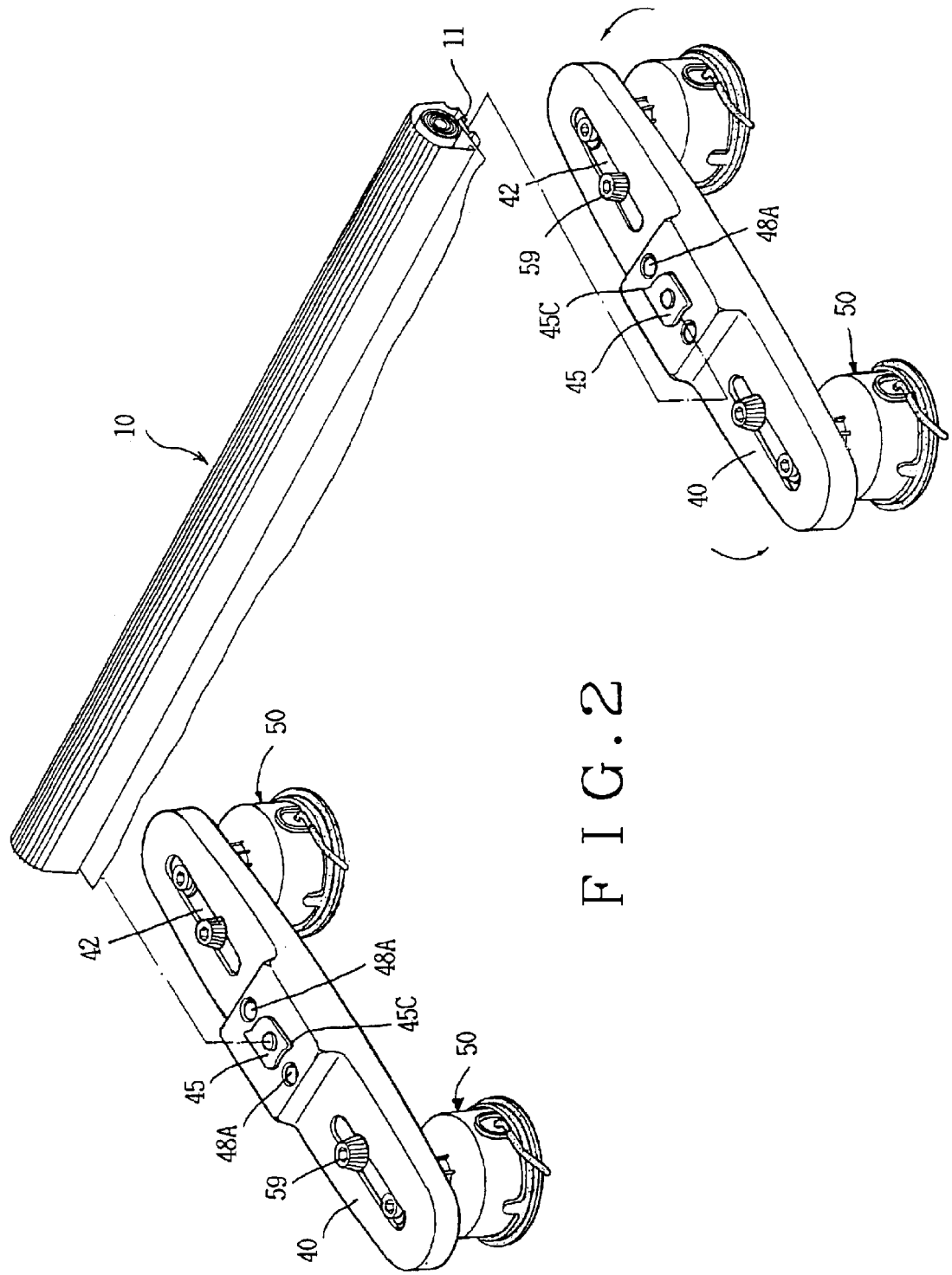
FIG. 2 is an exploded perspective view of an awning supported on roof panel for use outdoors according to the present invention.

Please refer to FIGS. 2, 4, and 5. To mount the automatic shade roller (10) to the two supporting frames (40), first align the supporting frame (40) with the shade roller (10), so that one of the two end portions (45B) of the retaining plate (45) is pointed toward and easily slid into two opposite slide ways (11) formed at a lower part of the shade roller (10). Then, the supporting frame (40) is turned counterclockwise by 90 degrees to become perpendicular to the shade roller (10). In this position, two retaining angles (45C) projected from two diagonally opposite corners on the two end portions (45B) of the retaining plate (45) would tightly press against inner wall surfaces of the two slide ways (11) without the risk of moving relative to the slide ways (11), and thereby firmly hold the shade roller (10) to the supporting frame (40). When both the two supporting frames (40) are connected to the slide ways (11) of the shade roller (10) in the above-mentioned manner without the need of using any tool, the shade roller (10) is easily assembled to the two supporting frames (40) to straddle a space between them.

With the above arrangements, the shade roller (10) may be conveniently mounted to or dismounted from the supporting frames (40) at any time.

There are two stepped round holes (47) provided at two opposite sides of the raised pad (44) for each receiving an elastic washer (48B) and a pressing stud (48A) therein. The elastic washer (48B) is movably mounted around a stem portion of the pressing stud (48A). When the pressing stud (48A) and the elastic washer (48B) are movably held in the stepped round hole (47) using an E-shaped clamp (49) mounted around a lower end of the stem portion of the pressing stud (48A) downward projected from a bottom of the stepped round hole (47), an elasticity of the elastic washer (48B) normally pushes the pressing stud (48A) upward to firmly press against a bottom surface of the shade roller (10) nearby the slide ways (11). The upward pressing forces from the two pressing studs (48A) and the elastic washers (48B) against the bottom of the shade roller (10) and the sideward pressing forces from the two retaining angles (45C) of the retaining plate (45) against the two slide ways (11) of the shade roller (10) together ensure a tight connection of the shade roller (10) to the supporting frames (40).

What is claimed is:

1. An awning supported on roof panel for use outdoors, comprising an automatic shade roller, a plurality of supporting frames for supporting said automatic shade roller thereon, and a plurality of adjustable sucker units coupled with said supporting frames for detachably attaching to a roof panel of an automobile;

each of said adjustable sucker units including from bottom to top a sucker, a slidable plate, a round-bottomed disk-shaped slide, a buffer spring, a collar, and a long bolt;

said sucker being integrally formed at a top center with a locating base, on a top surface of which there is provided with a round, concaved shallow recess, and an integral sleeve upward projected from a top center of said locating base;

said slidable plate being provided at a predetermined position near a central area thereof with a round-bottomed recess portion, which has a curvature corresponding to that of said concaved shallow recess on the top of said locating base; and said slidable plate having two longitudinal sides formed into two wing portions;

said disk-shaped slide being provided at a bottom with a downward convex portion, which has a curvature corresponding to that of said round-bottomed recess portion on said slidable plate; and each of said supporting frames being provided at two lateral sides with two elongated slots, integrally provided below each of said two lateral sides with a pair of vertically downward extended framing walls, and integrally provided on a central top portion with a raised pad having two mortises formed at two diagonally opposite corners thereof;

whereby said sucker units, said supporting frames, and said shade roller may be easily assembled to mount on the roof panel of the automobile to provide an awning for user outdoors without the need of using any tool.

2. The awning supported on roof panel for use outdoors as claimed in claim 1, wherein said pair of vertically downward extended framing walls of said supporting frame are provided at a lower part of two inner wall surfaces with two corresponding channels, and wherein said two wing portions of said slidable plate are adapted to slidably move into and along said two channels.

3. The awning supported on roof panel for use outdoors as claimed in claim 2, wherein said supporting frame includes a separate hold-down member provided below each lateral side, said hold-down member having two ends that are cut into two right-angled guides adapted to fitly bear against two lower inner corners of said two channels, so that said hold-down member may be slid along the lower inner corners of said channels.

4. The awning supported on roof panel for use outdoors as claimed in claim 1, wherein said raised pad on the central top portion of said supporting frame has as retaining plate mounted on a top thereof.

5. The awning supported on roof panel for use outdoors as claimed in claim 4, wherein said retaining plate has an overall length larger than that of said raised pad.

6. The awning supported on roof panel for use outdoors as claimed in claim 4, wherein said retaining plate is provided at a lower side below two diagonally opposite corners with two downward extended tenons adapted to engage with said two mortises provided at two diagonally opposite corners of said raised pad.

7. The awning supported on roof panel for use outdoors as claimed in claim 4, wherein said retaining plate is provided at two diagonally opposite corners of two longitudinal sides with two retaining angles.

8. The awning supported on roof panel for use outdoors as claimed in claim 1, wherein said supporting frame is provided at two opposite sides of said raised pad with two stepped round holes for each receiving an elastic washer and a pressing stud therein, and said elastic washer being movably mounted around a stem portion of said pressing stud.

* * * * *